Jan. 22, 1935.  L. A. ALEXANDER  1,988,770
TOOL FOR CUTTING SURFACES OF REVOLUTION
Filed April 13, 1931   2 Sheets-Sheet 1
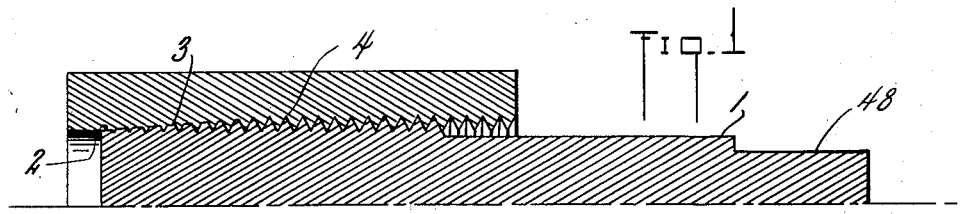
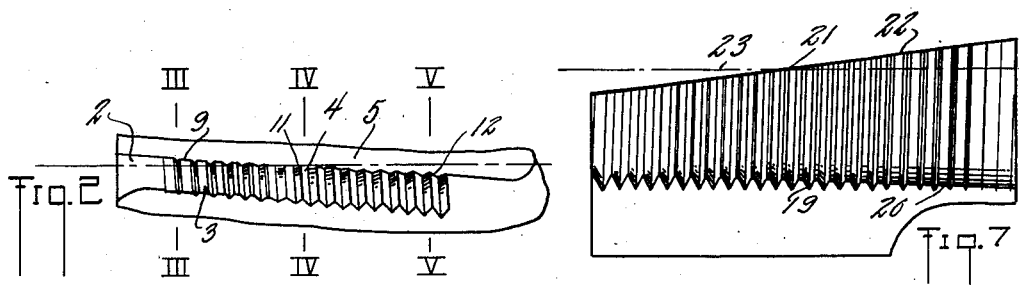
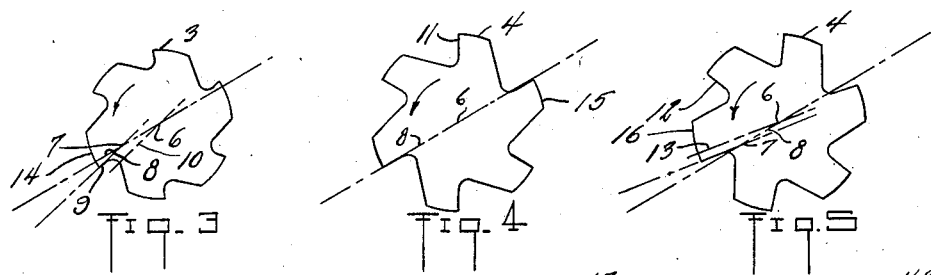
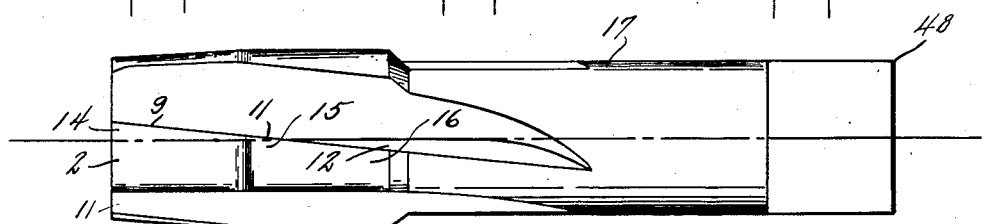
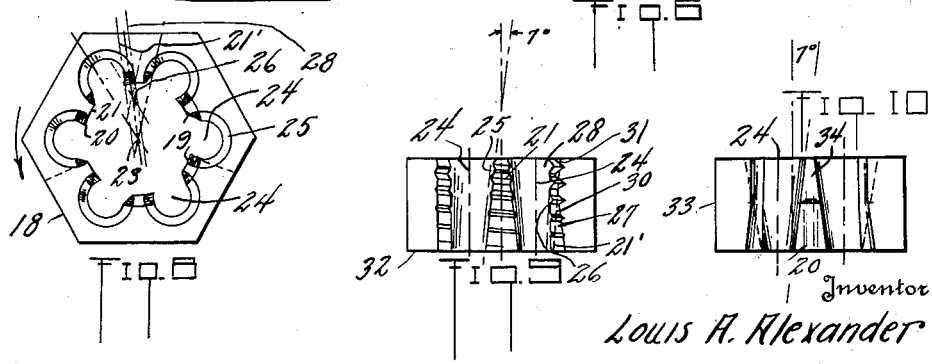
Inventor
Louis A. Alexander
By
Attorney Jan. 22, 1935. L. A. ALEXANDER 1,988,770
TOOL FOR CUTTING SURFACES OF REVOLUTION
Filed April 13, 1931 2 Sheets-Sheet 2
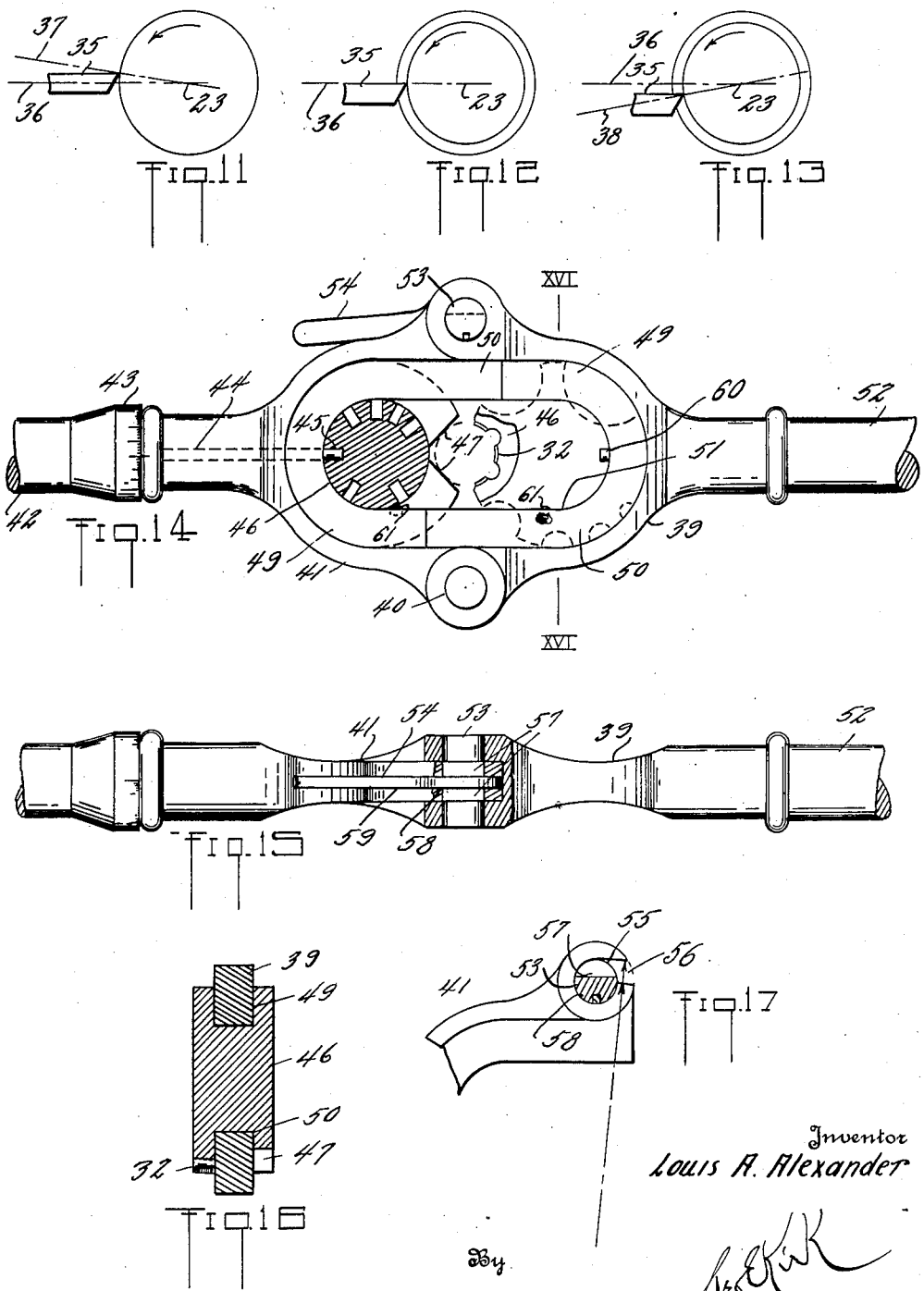

Patented Jan. 22, 1935

1,988,770

UNITED STATES PATENT OFFICE 1,988,770

TOOL FOR CUTTING SURFACES OF REVOLUTION

Louis A. Alexander, Toledo, Ohio

Application April 13, 1931, Serial No. 529,685

3 Claims. (Cl. 77—72)

This invention relates to determining surfaces of revolution, more particularly as to size and form.

This invention has utility when incorporated in dressing of material, especially with tools, whether by hand or in power tool machines, such as automatic screw machines, with working elements effecting reaming or threading whether through the medium of reamers, box tools, taps or dies by progressively varying the rake from positive past neutral to negative.

Referring to the drawings:

Fig. 1 is a partial section through a tap embodying features of an embodiment of the invention;

Fig. 2 is a fragmentary detail in plan of a portion of the tap of Fig. 1;

Fig. 3 is a configuration corresponding to a plane on the line III—III, Fig. 2, as an exaggerated diagrammatic illustration;

Fig. 4 is a diagrammatic showing of a configuration corresponding to a plane on the line IV—IV, Fig. 2;

Fig. 5 is a diagrammatic showing of a configuration corresponding to a plane on the line V—V, Fig. 2;

Fig. 6 is a view of a reamer involving features of the tap of Fig. 1;

Fig. 7 is a diagrammatic showing of the developed teeth of the die in accordance with the features involved in the tap of Fig. 1;

Fig. 8 is a back end view of the die as a one-piece element of Fig. 7;

Fig. 9 is a die portion of the type of die of Fig. 8, involving partable sections;

Fig. 10 is a view of a box section involving the features of the die of Fig. 9;

Fig. 11 is a diagrammatic showing of a stage in the cutting operation hereunder as initiated;

Fig. 12 shows a stage of the cutting operation hereunder as the cutting may be completed or approaching completion in a preferred embodiment when working with hard material, such as iron or steel;

Fig. 13 is a diagrammatic showing of the work as at the extreme from the cutting position and shown as a dragging or wiping position to finish the cutting as well as cooperating in steadying the work as to the cut in sequence of follower cutting edge sections hereunder;

Fig. 14 is a holder adapted for hand operation in the use of sectional dies, boxes, taps and reamers hereunder, parts being broken away;

Fig. 15 is an edge view of the holder of Fig. 14, parts being broken away;

Fig. 16 is a section on line XVI—XVI, Fig. 14; and

Fig. 17 is a fragmentary detail view of one of the hinge elements of the holder of Fig. 14.

Tool cylindrical member of tap 1 is shown as having tapered or chamfered entering portion 2 into work at which portion teeth 3 are of truncated form. These teeth or threads from this truncated portion 3 pass through development to full tooth 4 at the end of the chamfer 2 with the continuation of such full tooth form along the tap. As herein disclosed, longitudinal cut 5, through the series of teeth 3, 4, at this angular position around the tap 1, develops the series of cutting edge termini for the teeth. In the carrying out of the invention herein, say for iron or steel or like operations, importance resides in this cut 5 location and character. In carrying out this feature of the invention from center 6 there is taken eccentric point 7 for radius 8 (Fig. 3). Directed toward this eccentric point 7 in the radius 8 is cutting edge 9 extending parallel to a radius 10 in determining a positive rake. This cut 5 from this point desirably follows a line approximating 7° to the axis 6 of the tap and weaves therefrom to tooth 4 in there having the cut side 5 (Fig. 4) coincide with a radius from the center 6 in providing a neutral rake. From this position at point 4, the cut 5 continues its progress to have its direction for cutting face 11 further change from tooth 4.

In continuing this cut 5, the degree of progress further along at tap face 12 is of opposite inclination in radius through the point 7 to that in the point of the face 9 (Fig. 5) and is parallel to radius 13 of the tap. It is thus seen that face 9, as to outer face 14, is a cutting face having an overhang to provide a negative rake. This continuity merges in its progress into cutting face 11 having right angle with face 15 as a tangent as distinguishing from the acute angle 9, 14, while the progress as continuing to face 12 has, as to outer face 16, an obtuse angle.

Instead of this sequence of cutting for teeth by a tap, the same utility arises in connection with reamer 17, which at chamfer portion 2 has acute angle faces 9, 14 for positive rake. At the completion of this chamfer 2 there are right angle faces 11, 15 to neutral rake, while in the progress therealong there are obtuse angle faces 12, 16 to negative rake. This region between the faces 11, 15, and 12, 16, serves to wipe or finish for smooth facing of the work, and additionally is a steadying means for the entire tool as effecting the cutting operations along the chamfer 2 between the angle face regions 9, 14, and 11, 15.

In these operations for tools in cutting surfaces of revolution, these may be taken into account for an outside member instead of an inside member. The way 5 while following say the 7° cut has a long helix in the axis for this cut as weaving past the neutral midpoint where the angle is a right angle for right-hand cutting tools in operation, but for a left-hand thread working a converse would be in order. In a die an instance may be taken say of six cutting faces in a cycle and with die 18, say 4½ teeth long, set of teeth 19 may be in a series of say 27 teeth as developed for sequence from chamfer portion 20 to mid-portion 21 (Fig. 7). In the development these teeth may have their cutting edge produced by plane 22 at an angle of say 7° to the axis 23 of the work. In consolidating this development of teeth into a die block 18, tapered openings have their axes 24 eccentric of the axis 23 parallel thereto with a taper angle of 7°.

The taper of these openings 24 provides 7° angle faces 25 as to the axis 24. The dimension of these tapered eccentric openings is such as to permit ready spill of the turnings from the work and still provide ample material for holding the teeth portions. To this end in practice the main tooth portion 21 may be 30° as to the axis 23 from the opposing common radius therefrom as tangent to this intermediate portion of the tapered way. This gives an angle therefrom of 15° to the midpoint of the teeth extent when there is a four-series tooth block. With these tapered cuts in the box 18, there may be cutting back of the overhang at the portion of the teeth 19 as toward the axis 23, such cutting being at tooth portion 20 on plane 21' parallel to radius 26 at the tooth portion 27, and the teeth as extending therefrom will have their cutting face progress to have working face line 28 parallel to the radius 26 in the opposite side thereof from the parallel line 21'. This means that in this die, as in the tap, there is acute angle 27, 21', for the starting cut or positive rake to gradually merge toward right angle 26, 30, at the region 21 of neutral rake where the cutting is completed or may be completed and thereafter acting at wiping or dragging angle between faces 28, 31 of negative rake, in the finishing of the face or surface of revolution as developed.

It is thus seen that the chamfer portion teeth bring the work to a diameter size as well as start the cutting of the teeth while the portions between the angles 26, 30, and 28, 31, dress the cut faces into the desired work of revolution and steady the tool in the completion of such operations. Instead of this sequence of continuity for cutting embodied in a single element die 18, such may be in die section element 32 or in dressing box element 33 without teeth wherein the chamfer face 20 merges into cylindrical face portion 34.

Diagrammatically this theory of work of revolution cutting is disclosed wherein there is axis 23 and tool 35 (Fig. 11) starting its cut say at an angle of 7° from above plane 36 as shown by line 37 for positive rake and as the work progresses the cutting is decreased to have the tool 35 at the radius line 36 through the center 23 for neutral rake (Fig. 12). The further progress of this tool in finishing of the work hereunder, brings such to work in line 38 at an angle of approximately 7° from the line 36 in the drag or finishing operations of negative rake for smoothing irregularities in the cut face as well as steadying the tool for sequence of cutting operations as made therefrom (Fig. 13).

In the holding of these tools hereunder, provision is made of sectional hand-operated device embodying member 39 (Figs. 14, 15) having hinge pin 40 to connect such member 39 with member 41 provided with handle 42 and scale readings 43 whereby rotation of this handle 42 may have threaded coaction with stem 44 for thrusting into seat 45 in die block section 46 having as elements thereof the die sections 32. These multiple die sections 46 besides carrying on one side the various sizes of die 32, on the opposite have angle faces 47 as holders for gripping tap or reamer portions 48. The holder members 39, 41, have guide sections 49, 50, which, as registering provide oval way 51 for a pair of these multiple die section blocks 46. This member 39 has handle 52 similar to the handle 42. When this member 41 thereon is swung to have the handles 42, 52, in alignment, the portions 49, 50, register for a continuous way about the oval portion 51 in which the members or blocks 46 may coact as a rail or guide. Alignment for this position is effected by pin 53 having handle 54 rockable from way 55 through opening 56 as permitted by cut portions 57 of the pin 53. In bringing such pin 53 into recess 58 of the member 41, the handle 54 is within way 59.

It is accordingly seen that with this device there may be ready and convenient use for operating these tools into work, and in the instance of die there is special value hereunder, due to the fact that when the thread is cut by running this hand-operated device upon the work, tripping of the handle 54 to the reverse position allows opening of the die sections for removal from the work without the loss of time of running such back and accordingly facilitates for this operation, while the withdrawal of pins 45 or companion pin 60 will permit angular shifting of the members 46 or such members may be progressed toward each other in held position for a selected dimension.

In the opening up of the device by swinging the handles 42, 52, relatively to each other, members 46 do not slip out for spring balls 61 yieldably retain these devices in their positions in the oval way 51.

These working face cutting angles, as herein disclosed, have advantage of efficient line of approach in the carrying on of work effectively and have a value not only in hand-operated tools, but even in tool sections as well as complete units for machine or power operations.

It is to be seen from the foregoing and as diagrammatically illustrated in Figs. 11, 12, 13, that the advanced face 35 to the cutting edge or positive rake, as to the tangent when in the cutting position along radius 37, forms an acute angle with such tangent. As the follow up in the cutting is diminished the variable angularity changes, the face 35 of the tool comes to the radius line 36 and is there perpendicular or at right angles to the tangent of the portion of the work being acted upon or as neutral rake. In the further progress of the specific embodiment hereunder, the face 35 of this tool, which determines the working edge, has progressed to radius 38, and as to the tangent here with the work as past the tool, the angle is obtuse for negative rake, thereby giving the finishing or wiping action in contra-distinction to the initiation of the cutting along radius 37.

While 7° has been mentioned, it is to be understood that variation therefrom may be had according to the tool material, work material and speed of operation, as well as character of the cuts to be made. This 7° angle is taken as illustrative and one which has been tried out with measures of success.

What is claimed and it is desired to secure by United States Letters Patent is:

1. A rotary tool for roughing and finishing a cylindrical surface comprising a tool blade having a continuous cutting edge lying substantially in said surface and at an angle to an element of the said surface, receding in the direction of rotation from front roughing portion to rear finishing portion, the face of said blade being formed with continuously decreasing rake from front to rear so as to provide a positive rake at the roughing end of the blade, a neutral rake at a central section and a negative rake at the finishing end of said blade.

2. A reamer for roughing and finishing a cylindrical surface comprising a convex body, a tool blade therein having a continuous cutting edge lying substantially in said surface and at an angle to an element of the said surface, receding in the direction of rotation from front roughing portion to rear finishing portion, the face of said blade being formed with continuously decreasing rake from front to rear so as to provide a positive rake at the roughing end of the blade, a neutral rake at a central section, and a negative rake at the finishing end of said blade.

3. A cutting tool for relative rotation between the tool and work for roughing and finishing a cylindrical surface, said tool comprising a body having cutting edge means lying substantially in said cylindrical surface and receding in a direction of rotation from a front roughing portion to a rear finishing portion, the active face portion of said tool being formed with decreasing rake from front to rear so as to provide a positive rake at the roughing end of the cutting edge means, a neutral rake at a central section, and a negative rake at the finishing end of said cutting edge means.

LOUIS A. ALEXANDER.